United States Patent
Gerstel et al.

(10) Patent No.: US 6,721,508 B1
(45) Date of Patent: Apr. 13, 2004

(54) OPTICAL LINE TERMINAL ARRANGEMENT, APPARATUS AND METHODS

(75) Inventors: Ornan A. Gerstel, New York, NY (US); Rajiv R. Ramaswami, Yorktown Heights, NY (US)

(73) Assignee: Tellabs Operations Inc.

( * ) Notice: Subject to any disclaimer, the term of this patent is extended or adjusted under 35 U.S.C. 154(b) by 0 days.

(21) Appl. No.: 09/293,775

(22) Filed: Apr. 19, 1999

Related U.S. Application Data

(60) Provisional application No. 60/112,510, filed on Dec. 14, 1998.

(51) Int. Cl.$^7$ .................................................. H04J 14/02
(52) U.S. Cl. ........................... 398/83; 398/43; 398/45; 398/48; 398/79; 398/82
(58) Field of Search .......................... 359/124, 125, 359/127, 128, 139; 398/43, 45, 48, 79, 82, 83

(56) References Cited

U.S. PATENT DOCUMENTS

| | | | |
|---|---|---|---|
| 4,821,255 A | 4/1989 | Kobrinski | 370/3 |
| 5,317,439 A | 5/1994 | Fatehi et al. | 359/110 |
| 5,457,556 A | 10/1995 | Shiragaki | 359/117 |
| 5,488,500 A | 1/1996 | Glance | 359/127 |
| 5,493,625 A | 2/1996 | Glance | 385/24 |
| 5,504,827 A | 4/1996 | Schimpe | 385/24 |
| 5,675,676 A | 10/1997 | Yamashita et al. | 385/24 |
| 5,708,753 A * | 1/1998 | Frigo et al. | 385/147 |
| 5,712,932 A | 1/1998 | Alexander et al. | 385/24 |
| 5,739,935 A | 4/1998 | Sabella | 359/128 |
| 5,760,934 A | 6/1998 | Sutter et al. | 359/119 |
| 5,771,112 A * | 6/1998 | Hamel et al. | 359/128 |
| 5,777,761 A | 7/1998 | Fee | 359/110 |
| 5,778,118 A | 7/1998 | Sridhar | 385/24 |
| 5,867,289 A | 2/1999 | Gerstel et al. | 359/110 |
| 5,884,017 A * | 3/1999 | Fee | 395/182.02 |
| 6,084,694 A | 7/2000 | Milton et al. | 359/124 |
| 6,295,146 B1 * | 9/2001 | Nathan et al. | 359/119 |
| 6,493,117 B1 | 12/2002 | Milton et al. | 359/124 |

OTHER PUBLICATIONS

R. Ramaswami, "Multiwavelength Lightwave Networks for Computer Communication," IEEE Communications Magazine, pp. 78–88 (1993).

R. Ramaswami et al., "Design of Logical Topologies for Wavelength–Routed Optical Networks," IEEE Journal on Selected Areas in Communications, V. 14, N. 5, pp. 840–851 (1996).

(List continued on next page.)

*Primary Examiner*—Jason Chan
*Assistant Examiner*—M. R. Sedighian
(74) *Attorney, Agent, or Firm*—Fitzpatrick, Cella, Harper & Scinto

(57) ABSTRACT

A wavelength division multiplexed optical communication system includes a plurality of optical line terminals which may be part of separate in service networks, each having a line interface and an all-optical pass-through interface including a plurality of pass-through optical ports, and each also including a plurality of local optical ports which are connectable to client equipment and an optical multiplexer/demultiplexer for multiplexing/demultiplexing optical wavelengths. The optical multiplexer/demultiplexer may include one or more stages for inputting/outputting individual wavelengths or bands of a predetermined number of wavelengths, or a combination of bands and individual wavelengths. At least one of the pass-through optical ports of an optical line terminal of one network may be connected to at least one of the pass-through optical ports of an optical line terminal of another network to form an optical path from the line interface of the optical line terminal of the one network to the line interface of the optical line terminal of the another network to form a merged network. The use of such optical line terminals allows the upgrading and merging of the separate networks while in service.

23 Claims, 6 Drawing Sheets

OTHER PUBLICATIONS

O. Gerstel et al., "Cost Effective Traffic Grooming in WDM Rings," IEEE Infocom, San Francisco, Mar. 29–Apr. 2, 1998, pp. 69–77.

R. Ramaswami et al., "Routing and Wavelength Assignment in All– Optical Networks," IEEE/ACM Transactions on Networking, V. 3, No. 5, pp. 489–500 (1995).

R. Ramaswami et al., "Multiwavelength Optical Networks with Limited Wavelength Conversion," IEEE Infocom, vol. 2, pp. 489–498, 1997.

R. Ramaswami et al., *Optical Networks, A Practical Perspective*, Academic Press (1998). (Complete Book).

\* cited by examiner

US 6,721,508 B1

OPTICAL LINE TERMINAL ARRANGEMENT, APPARATUS AND METHODS

CROSS-REFERENCE TO RELATED APPLICATIONS

This application claims the benefit of U.S. Provisional Application No. 60/112,510, filed Dec. 14, 1998.

FIELD OF THE INVENTION

The invention is in the field of optical telecommunications, and more particularly, pertains to upgrading an in-service wavelength division multiplexed (WDM) optical communication system including a pair of optical line terminals (OLTs) that reside in the same office and are part of separate WDM networks to form an all optical pass-through from the line side of one OLT of the pair to the line side of the other OLT of the pair.

BACKGROUND OF THE INVENTION

Wavelength division multiplexing (WDM) is an approach for increasing the capacity of existing fiber optic networks. A WDM system employs plural optical signal channels, each channel being assigned a particular channel wavelength. In a WDM system optical signal channels are generated, multiplexed to form an optical signal comprised of the individual optical signal channels, transmitted over a single waveguide, and demultiplexed such that each channel wavelength is individually routed to a designated receiver.

SUMMARY OF THE INVENTION

In typical wavelength division multiplexing systems all wavelengths are constrained to pass through from a source optical node to a predetermined sink optical node.

In view of the above it is an aspect of the invention to selectively pass-through, add or drop individual wavelengths at selected optical nodes.

It is another aspect of the invention to utilize optical line terminals having all-optical pass-through interfaces that provide for continued transmission of optical signals without any intervening electro-optical conversion, and to connect two optical line terminals back-to-back at their respective pass-through interfaces to provide an optical path from the line side interface of the first optical line terminal to the line side interface of the second optical line terminal.

It is yet another aspect of the invention to utilize optical line terminals having a multiplexer/demultiplexer including one or more stages for inputting/outputting individual wavelengths or bands of a predetermined number of wavelengths, or a combination of bands and individual wavelengths.

It is a further aspect of the invention to utilize the optical line terminals to support complex mesh network structures while permitting growth of an in-service network without disrupting network service.

It is yet a further aspect of the invention to provide a wavelength division multiplexed optical communication system including a plurality of optical line terminals, each having a line interface and an all-optical pass-through interface including a plurality of pass-through optical ports and each also including a plurality of local optical ports and an optical multiplexer/demultiplexer for multiplexing/demultiplexing transmitted/received wavelengths. The optical multiplexer/demultiplexer may include one or more stages for inputting/outputting individual wavelengths or bands of a predetermined number of wavelengths, or a combination of bands and individual wavelengths, with at least one of the pass-through optical ports of one of the optical line terminals being connected to at least one of the pass-through optical ports of another optical line terminal to form an optical path from the line side interface of the one of the optical line terminals to the line side interface of the another optical line terminal.

These and other aspects and advantages of the invention will be apparent to those of skill in the art from the following detailed description.

DETAILED DESCRIPTION

Figure 1:
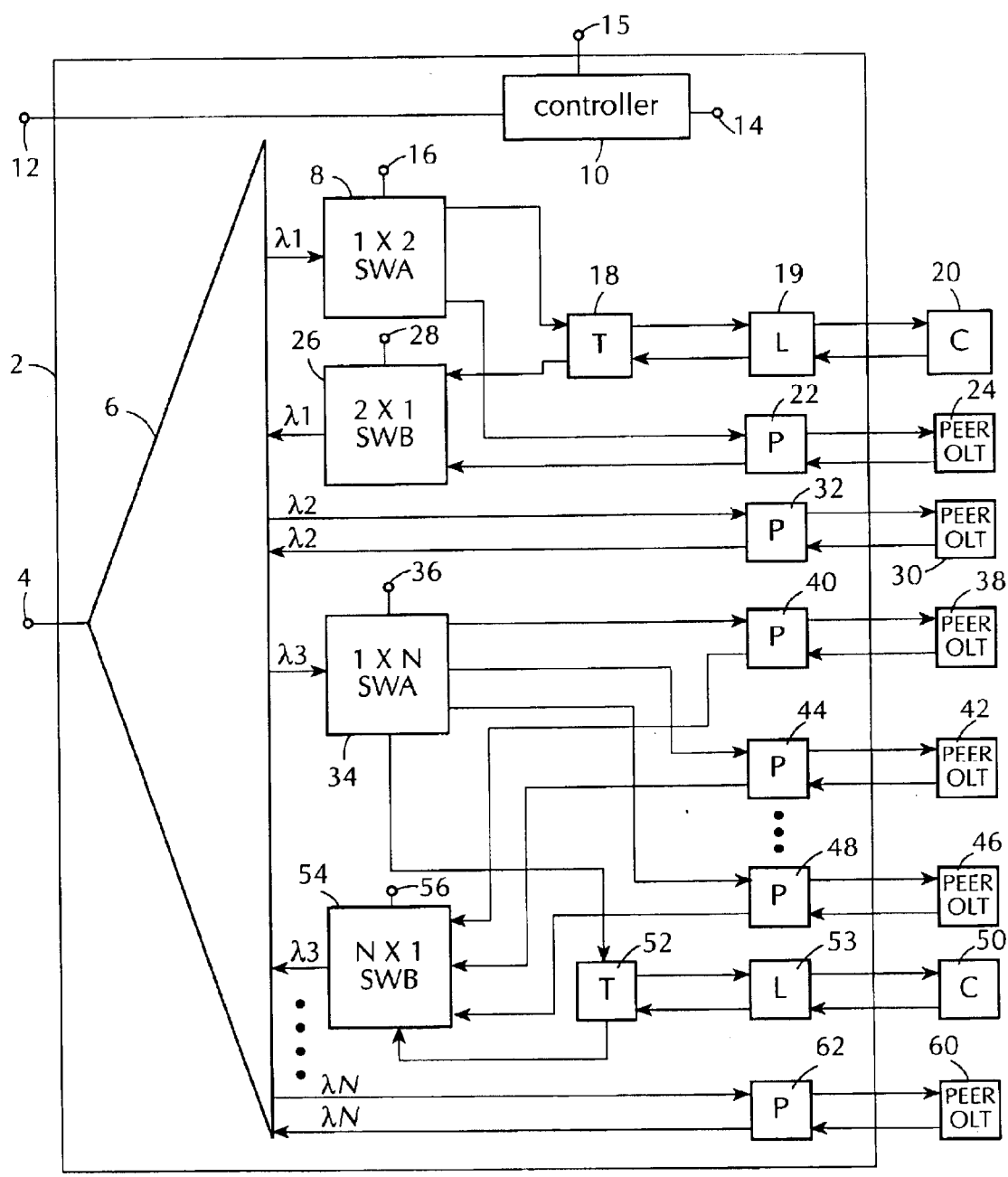
FIG. 1 is a block diagram of an optical line terminal.

FIG. 1 is a block diagram of an optical line terminal (OLT) 2 which is the basic element of the present embodiment. The OLT 2 has an input/output line interface 4 which is connected to an external fiber facility and transmits/receives an optical signal having N optical wavelengths, for example 32 wavelengths, on a single optical fiber which is multiplexed/demultiplexed by a multiplexer/demultiplexer 6, which outputs demultiplexed wavelengths $\lambda 1$–$\lambda N$ on individual optical fibers. The respective wavelengths $\lambda 1$–$\lambda N$ are sent either to a peer OLT via a pass-through port or to client equipment via a transponder and a local port. The client equipment includes SONET equipment, add/drop multiplexers, cross-connect switches, internet protocol (IP) routers, asynchronous transfer mode switches (ATM) and the like.

As employed herein an optical signal is generally intended to encompass wavelengths in the range of approximately 300 nanometers to approximately 2000 nanometers (UV to far IR). This range of wavelengths can be accommodated by the preferred type of optical conductor (a fiber optic), which typically operates in the range of approximately 800 nanometers to approximately 1600 nanometers.

Consider $\lambda 1$ which is provided to a 1×2 switch 8 which is controlled by a control signal, having at least N states, from a controller 10. The controller 10 responds to a command, from a management system (not shown), at a terminal 12 to provide the control signal at a terminal 14 and then to control terminal 16 of switch 8 to position the switch 8 in a first or second position. When in the first position, $\lambda 1$ is provided to a transponder 18 which transmits $\lambda 1$ to a client apparatus 20 via a local port 19. When in the second position $\lambda 1$ is provided to a pass-through port 22 to a corresponding pass-through port in a peer OLT 24. The control signal is also provided to output terminal 15, and then to control terminal 16 of a corresponding switch 8 in peer OLT 24 to route λ1 to the corresponding multiplexer/demultiplexer 6. If it is desired to send λ1 to both client apparatus 20 and peer OLT 24, an optical splitter can be used in place of the switch 8.

Switch 26 selects λ1 coming from the opposite direction in response to a control signal at terminal 28 from controller 10 to position switch 26 in a first or second position. When in the first position, λ1 is received from client 20 via local port 19 and transponder 18, and when in the second position λ1 is received from peer OLT 24 via pass-through port 22, and then is provided to multiplexer/demultiplex 6 to be multiplexed with the other received wavelengths λ2–λN.

A wavelength can be directly passed-through to a peer OLT rather than being sent to a client apparatus. For example, λ2 is directly sent to, and received from, peer OLT 30 via pass-through port 32.

A 1×N switch can be used to send/receive a wavelength to/from one of N–1 peer OLTs or a client apparatus. For example, 1×N switch 34 under control of a control signal, having at least N states, provided to terminal 36 from controller 10 sends λ3 to either peer OLT 38 via pass-through port 40, or peer OLT 42 via pass-through port 44, or peer OLT 46 via pass-through port 48 or client apparatus 50 via transponder 52 and local port 53. Reception of λ3 in the opposite direction is controlled by N×1 switch 54 under control of a control signal provided to terminal 56 from controller 10, and than is provided to multiplexer/demultiplexer 6 to be multiplexed with the other received wavelengths.

As discussed above, a wavelength can be passed-through to a peer OLT via a pass-through port or can be optically switched to a client apparatus via a local port. λN is shown as being directly passed through to, or received from, peer OLT 60 via pass-through port 62.

Figure 2:
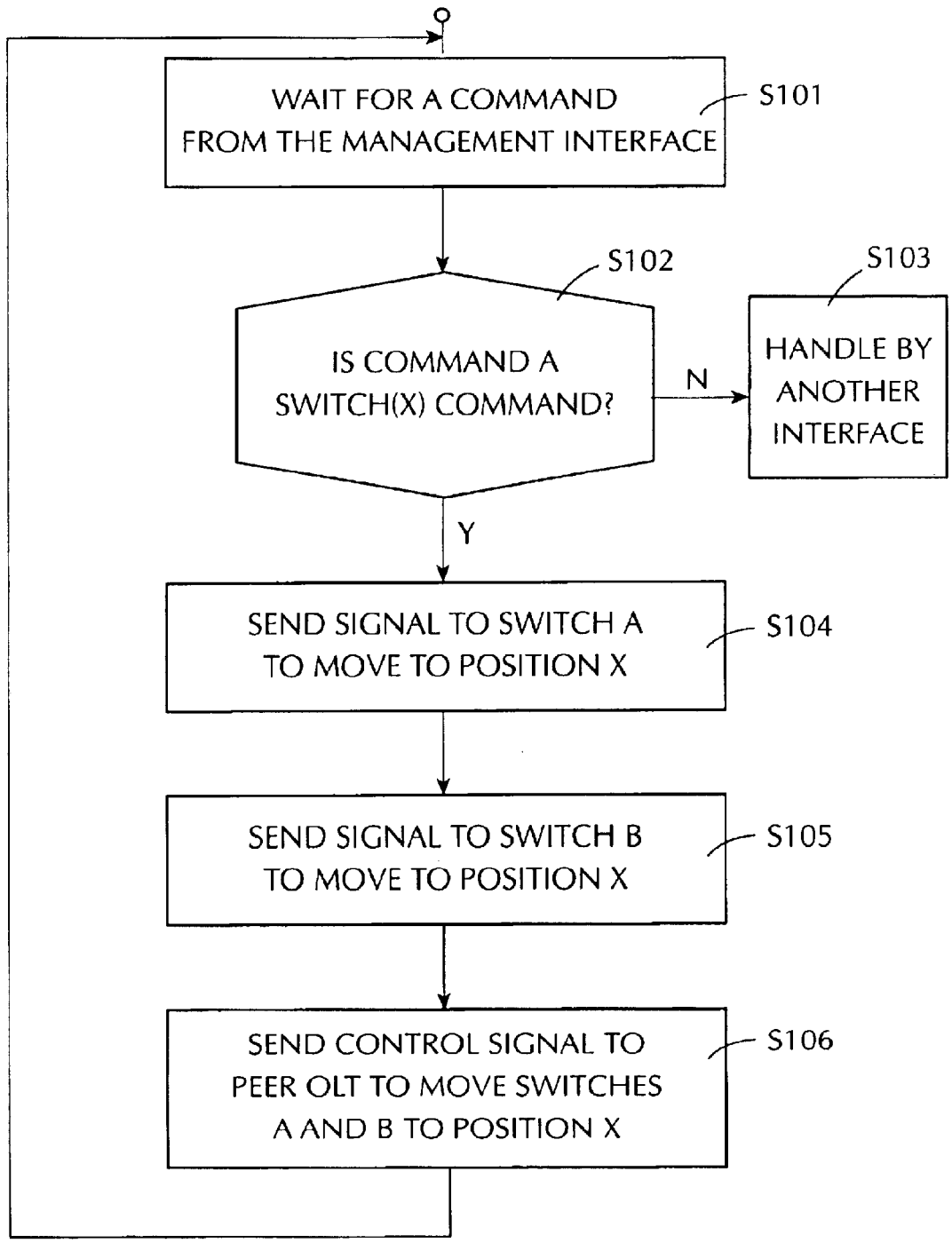
FIG. 2 is a flow chart of the control steps executed by the controller 10 of FIG. 1.

FIG. 2 is a flow chart of the steps performed by the controller 10 of FIG. 1 to control the 1×2 switches 8 and 26, and the 1×N switches 34 and 54 to route the respective wavelengths λ1–λN.

In step S101 the controller 10 waits for a command from a management system such as a computer (not shown). At step S102 a determination is made as to whether or not the command is a switch control signal to either pass-through the wavelength via a pass-through port to a peer OLT or drop/add the wavelength locally at/from a client apparatus via a transponder and a local port. If the answer is no, the command is handled by another interface (not shown) at step S103. If the answer is yes, a signal is sent to switch A (for example switch 8 or 34) to move switch A to transmit position X (the selected position) at step S104, and at S105 a signal is sent to switch B (for example switch 26 or 54) to move switch B to receive position X (the selected position). At step 106 the control signal at terminal 15 of controller 10 is sent to the peer OLT to set its switches A and B in a corresponding manner. A loop-back is then made to step S101 to wait for the next command.

In the multiplexer/demultiplexer 6 of FIG. 1, 32 wavelengths on a single optical fiber received at line interface 4 are demultiplexed into 32 individual wavelengths λ1–λ32. However, according to another aspect of the invention the 32 wavelengths can be demultiplexed into bands, for example four bands of 8 wavelengths each, by a first multiplexer, and the resultant four bands can be processed by the OLT. According to another aspect of the invention at least one of the four bands of wavelengths can be demultiplexed by a second multiplexer/demultiplexer into its individual wave lengths such that the OLT can process the individual wavelengths of the at least one band and the remaining ones of the four bands.

Figure 3:
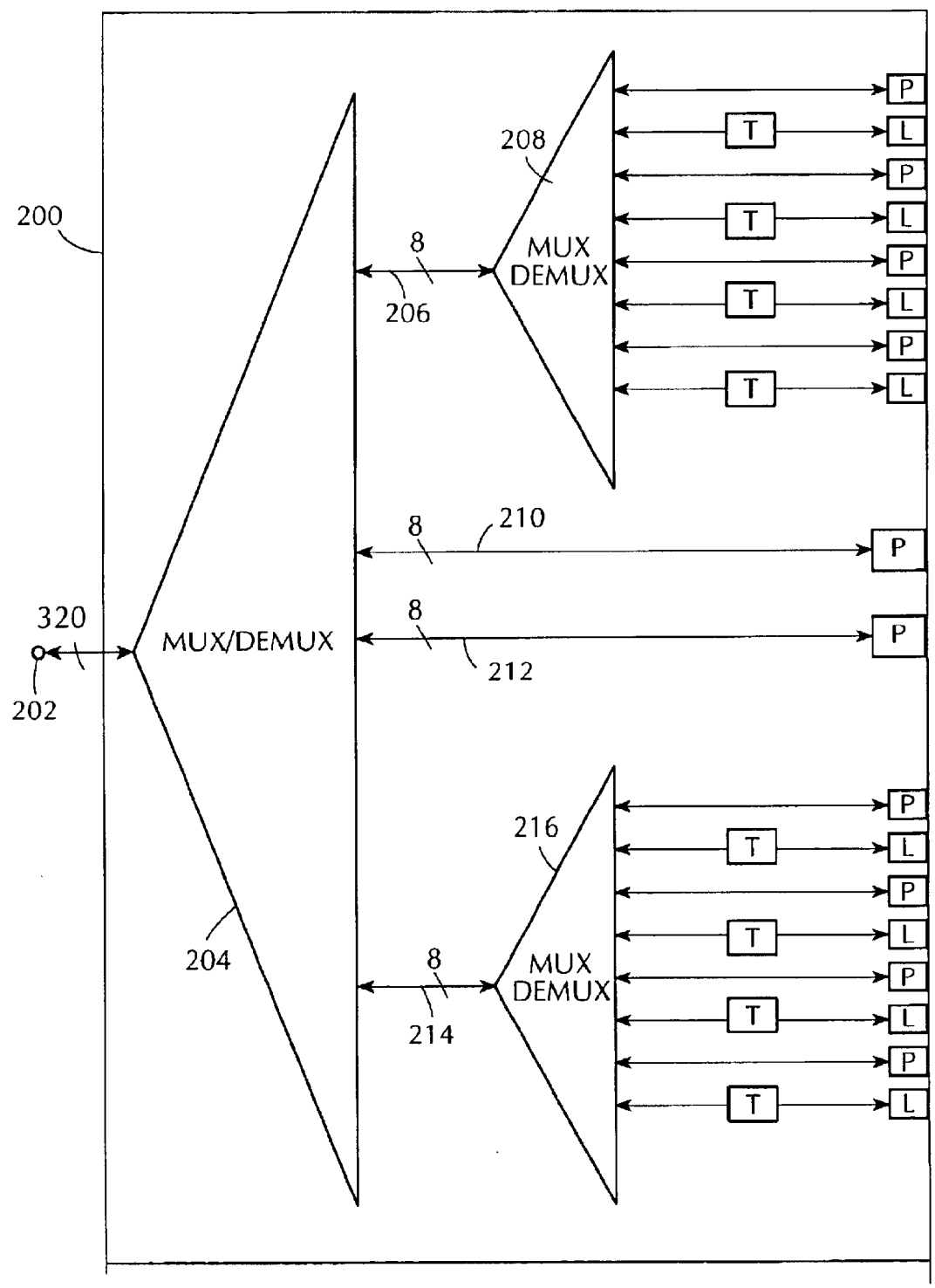
FIG. 3 is a block diagram of an optical line terminal having a two-stage multiplexer/demultiplexer.

FIG. 3 is a block diagram illustrating a modular OLT 200 having two stages of multiplexing/demultiplexing. The operation of the OLT 200 is described with respect to the demultiplexing operation; however, it is to be understood that the multiplexing is merely the reverse operation. It is to be noted that the 1×2 switches and 1×N switches shown in FIG. 1 are not included in FIG. 3 in order to simplify the drawing. However, it is to be understood that in practice such switches may be utilized in the practice of the invention. The OLT terminal 200 has an input/output line interface 202 which is connected to an external fiber facility and receives on a single optical fiber N, for example 32, wavelengths which are demultiplexed by a multiplexer/demultiplexer 204, which is situated on a first modular card, into M, for example 4, bands of 8 wavelengths each. The first band 206 (λ1–λ8) is demultiplexed into its 8 individual wavelengths by a multiplexer/demultiplexer 208, which is situated on a second modular card, with each such wavelength being provided to a pass-through port (P) or a local port (L) via transponder (T). Each of the pass-through ports (P) is situated on a different modular card, and each of the transponder (T) and its associated local port (P) are situated together on yet another modular card. Although direct connections are shown, as discussed above the respective wavelengths may be selectively switched to either of a local port (L) via transponder (T), or a pass-through port (P) as described with respect to FIG. 1.

The second band 210 (λ9–λ16) is provided directly to a pass-through port (P), and the third band 212 (λ17–λ24) is provided directly to a pass-through port (P).

The fourth band 214 (λ25–λ32) is demultiplexed into its 8 individual wavelengths by a multiplexer/demultiplexer 216, which is situated on a modular card 217, with each such wavelength being provided to a pass-through port (P) or a local port (L) via a transponder (T). Again, switching may be used to select a connection to either P or T.

Figure 4:
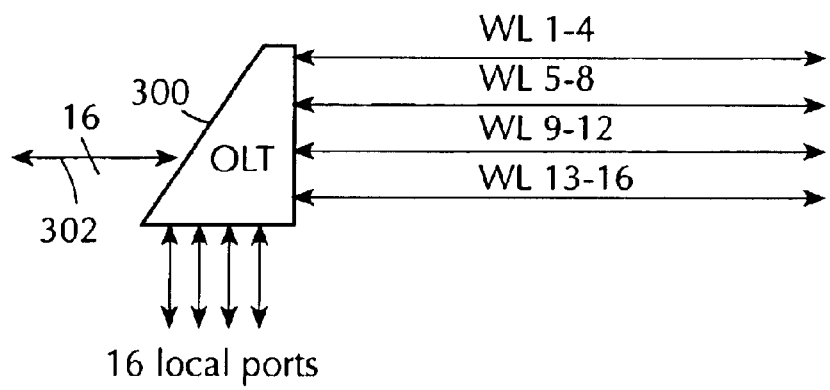
FIG. 4 is a schematic diagram representative of the optical line terminal of FIG. 1 or FIG. 3.

FIG. 4 is a simplified schematic diagram representative of the OLT 2 shown in FIG. 1 or the OLT 200 of FIG. 3. However, it is to be noted that for simplicity only 16 wavelengths are utilized. The OLT 300 interfaces and operates in a bidirectional manner as discussed in detail with respect to FIGS. 1 and 3. The line interface 302 is adapted for wavelength division multiplexed (WDM) optical communication signals of the highest relative order, in this example 16 wavelengths λ1–λ16, corresponding to the N optical wavelengths on a single optical fiber which are applied to input/output line interfaces 4 and 202 of OLT 2 (FIG. 1) and OLT 200 (FIG. 3), respectively. The pass-through interface connected to the lines WL 1–4, WL 5–8, WL 9–12 and WL 13–16 corresponds to the respective pass-through ports, and the local-interface connected to the lines labeled 16 local ports correspond to the local ports connected to the respective transponders, where wavelengths from or to client equipment are added or dropped.

Figure 5:
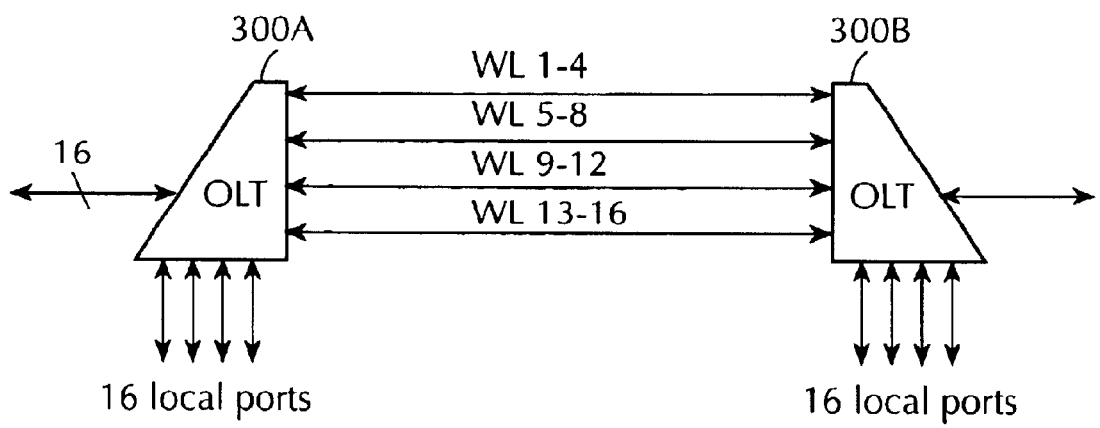
FIG. 5 is a schematic diagram of two optical line terminals such as in FIG. 4 being connected back-to-back.

FIG. 5 illustrates two OLTs 300A and 300B as shown in FIG. 4 connected in a back-to-back relationship by way of their respective all-optical pass-through interfaces. Thus, it is seen that the connection results in an optical add/drop multiplexer (OADM) functionality without requiring intermediate electro-optical conversion (OEO) of the communicated optical signals. As discussed above, the add/drop feature is achieved at the 16 local ports of each OLT, where channels (wavelengths) can be added or dropped by a manual configuration, or via add/drop switching, as controlled by switches 8 and 26 of FIG. 1, to achieve a switchable add/drop multiplexer.

The pass-through may be accomplished using single conductors and/or ribbon connectors that pass multiple individual channels (wavelengths) in one cable. The pass-through connections between OLTS 300A and 300B is preferably made using ribbon connectors/cables.

Figure 6:
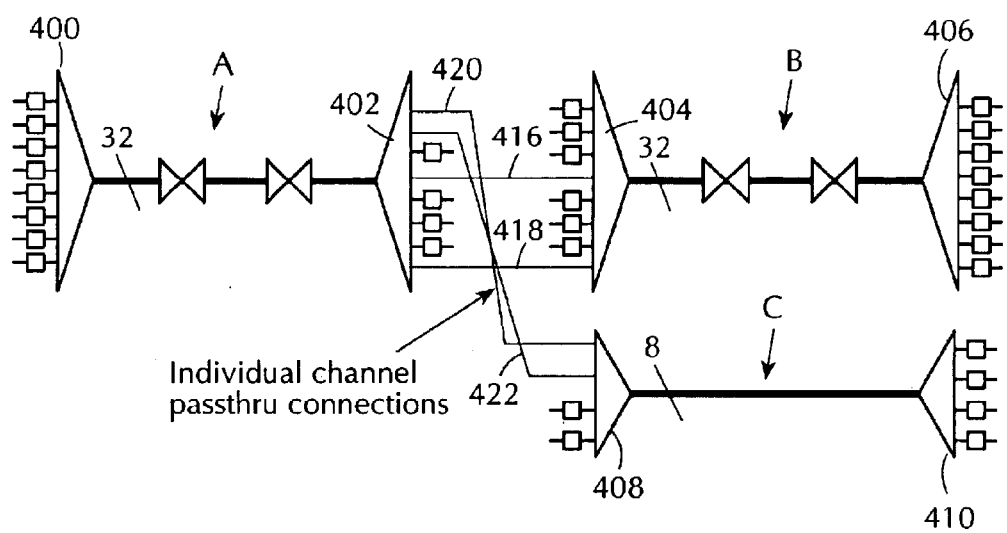
FIG. 6 is a diagram illustrating how at least two separate point-to-point WDM systems can be upgraded while in-service to form a merged point-to-point WDM system.

FIG. 6 illustrates three separate in-service WDM point-to-point optical communication systems A, B and C which are not initially interconnected. WDM system A includes optical nodes 400 and 402 which are optically connected via their respective line interfaces, with at least optical node 402 being an OLT. WDM system B includes optical nodes 404 and 406 which are optically connected via their respective line interfaces, with at least optical node 404 being an OLT. WDM system C includes optical nodes 408 and 410 which are optically connected via their respective line interfaces, with at least optical node 408 being an OLT.

As discussed above, the three separate WDM systems are not initially interconnected. However, any two of the three WDM systems, or all three of the WDM systems, may be interconnected by connecting respective OLTs of the separate WDM system back-to-back at respective pass-through ports as shown in FIG. 5, without disrupting service. For example, WDM system A may be connected to WDM system B by directly optically connecting pass-through ports of the OLT of node 402 to pass-through ports of the OLT of node 404 via optical fibers 416 and 418. WDM system A may also be connected to WDM system C by directly optically connecting pass-through optical ports of the OLT of node 402 to pass-through ports of the OLT of node 408 via optical fibers 420 and 422. Thus, an all optical path is provided from optical node 400 of WDM system A to optical node 406 of WDM system B, and likewise an all optical path is provided from optical node 400 of WDM system A to optical node 410 of WDM system C, resulting in a merger of WDM systems A, B and C without disrupting service. At the back-side of the respective optical nodes, lines with a box are indicative of local ports (L) to which client equipment is normally connected.

Figure 7:
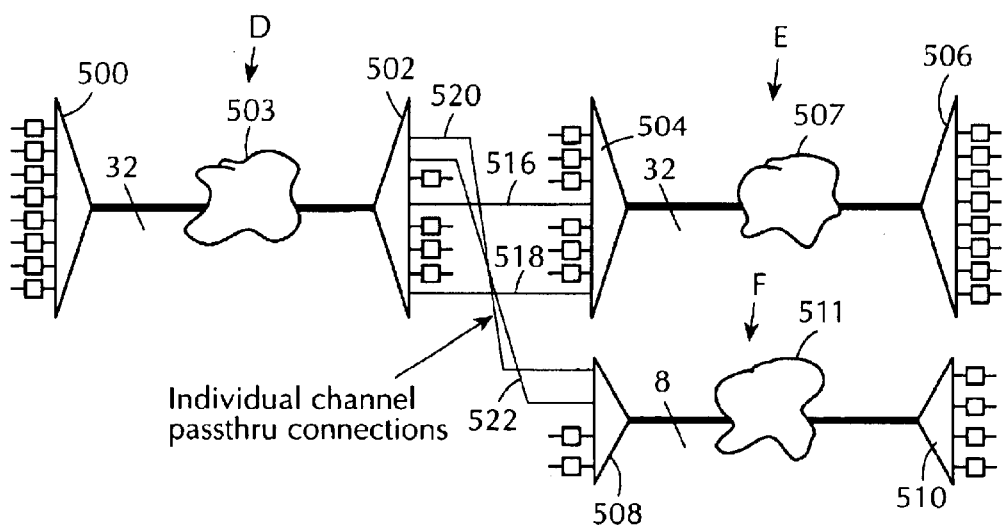
FIG. 7 is a diagram illustrating how at least two separate network WDM systems can be upgraded while in-service to form a merged network WDM system.

FIG. 7 illustrates three separate in-service WDM network optical communication systems D, E and F which are not initially interconnected. WDM system D includes optical nodes 500 and 502 which are optically connected via their respective line interfaces through an optical network 503, with at least optical node 502 being an OLT. WDM system E includes optical nodes 504 and 506 which are optically connected via their respective line interfaces through an optical network 507, with at least optical node 504 being an OLT. WDM system F includes optical nodes 508 and 510 which are optically connected via their respective line interfaces through an optical network 511, with at least optical node 508 being an OLT.

As discussed above, the three separate WDM optical networks are not initially interconnected. However, any two of the three WDM optical networks, or all three of the WDM optical networks may be interconnected by connecting respective OLTs of the separate WDM optical networks back-to-back at respective pass-through ports as shown in FIG. 5, without disrupting service. For example, WDM optical network D may be connected to WDM optical network E by directly optically connecting pass-through ports of the OLT of node 502 to pass-through ports of the OLT of node 504 via optical fibers 516 and 518. WDM system D may also be connected to WDM optical network F by directly optically connecting pass-through optical ports of the OLT of node 502 to pass-through ports of the OLT of node 508 via optical fibers 520 and 522. Thus, an all optical path is provided from optical node 500 of WDM optical network D to optical node 506 of WDM optical network E, and likewise an all optical path is provided from optical node 500 of WDM optical network D to optical node 510 of WDM optical network F, resulting in a merger of WDM network optical communication systems D, E and F without disrupting service. At the back-side of the respective optical nodes, lines with a box are indicative of local ports (L) to which client equipment is normally connected.

Figure 8:
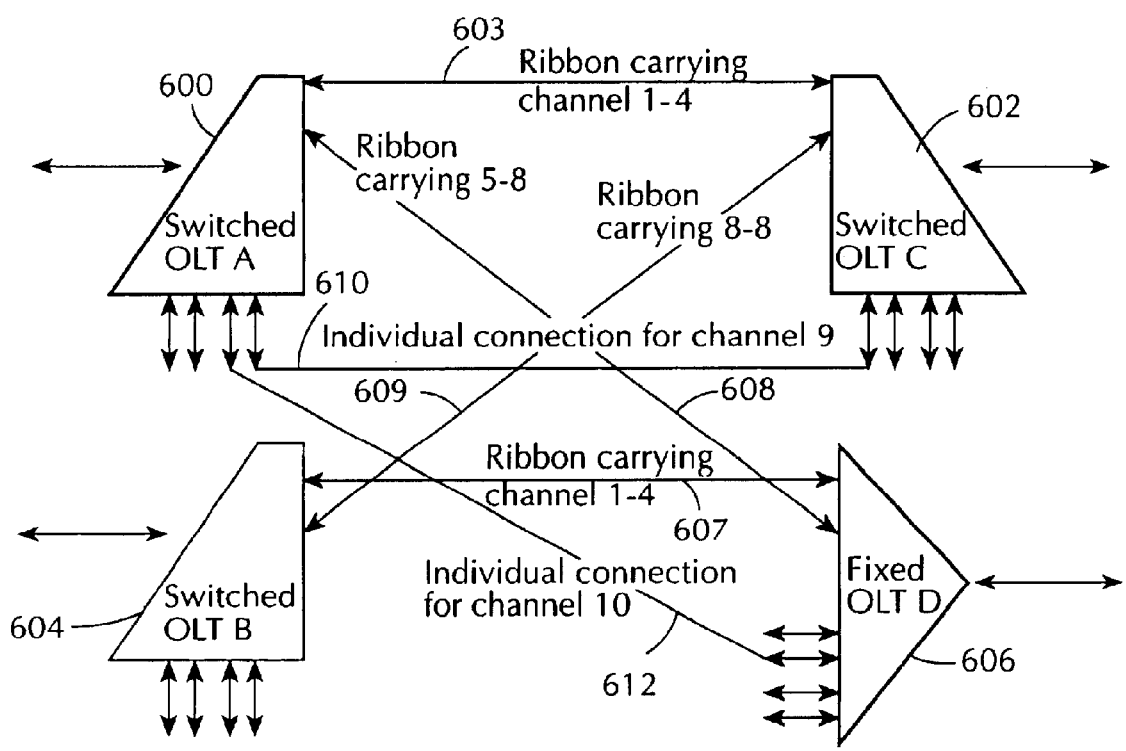
FIG. 8 illustrates a mesh connection between a plurality of optical line terminals.

FIG. 8 illustrates how OLTs can be connected in more complex ways to achieve greater functionality, such as, for example, limited cross-connection capabilities. Specifically, OLT 600 and OLT 602 are connected back-to-back to form a first OADM, OLT 604 and OLT 606 are connected back-to-back to form a second OADM, OLT 600 and OLT 606 are connected back-to-back to form a third OADM and OLT 602 and OLT 604 are connected back-to-back to form a fourth OADM. OLT 600, OLT 602 and OLT 604 each have add/drop switching capability, whereas OLT 606 has no switching capability.

The arrangement shown in FIG. 8 illustrates how a group of OLTs in an office, which may be part of separate WDM networks, can be coupled to form different OADMs on an individual channel or per band basis. Wavelengths 1, 2, 3 and 4 (channels 1, 2, 3 and 4) are connected between pass-through optical ports of OLT 600 and OLT 602 via optical fiber 603 and are also connected between pass-through optical ports of OLT 604 and OLT 606 via optical fiber 607. Wavelengths 5, 6, 7 and 8 (channels 5, 6, 7 and 8) are connected between pass-through optical ports of OLT 600 and OLT 606 via optical fiber 608 and are also connected between pass-through optical ports of OLT 602 and OLT 604 via optical fiber 609. Wavelengths 9, 10, 11 and 12 (channels 9, 10, 11 and 12) can be separated into individual channels that are connected between local ports of the respective OLTs. For example, channel 9 is directly connected between a local port of OLT 600 and a local port of OLT 602 via optical fiber 610, and channel 10 is directly connected between a local port of OLT 600 and a local port of OLT 606 via optical fiber 612. To simplifiy the drawing, no connections are shown for wavelengths 11 and 12; however, they may be connected in a like manner. The local ports may also be connected to client equipment as discussed above. It is to be noted that the connection configuration of FIG. 8 does not constitute a plain patch-panel form of connectivity, insofar as it allows for switching of channels without manual reconfigurations.

In summary, the methods and apparatus of the present invention allow upgrading of a wavelength division multiplexed optical communication system including a pair of OLTs that reside in the same office or facility and are part of separate WDM networks (whether point-to-point links or more advanced networks) to form an OADM. Such upgrade is accomplished without service disruption to the network by appropriate connection of the OLTs through the pass-through interfaces.

Although certain embodiments of the invention have been described and illustrated herein, it will be readily apparent to those of ordinary skill in the art that a number of modifications and substitutions can be made to the preferred example methods and apparatus disclosed and described herein without departing from the true spirit and scope of the invention.

What is claimed is:

1. A wavelength division multiplexed (WDM) optical communication system comprising:
   a first optical line terminal comprising:
      a line interface to receive from external to the system a first WDM optical signal having multiplexed therein at least one optical wavelength to be locally dropped by the system and at least one pass-through optical wavelength that is not to be locally dropped by the system;
      a first demultiplexer to demultiplex from the received first WDM optical signal the at least one optical wavelength to be locally dropped by the system;
      a first all-optical pass-through port to which the at least one pass-through wavelength of the received first WDM optical signal is provided optically to the exclusion of the at least one optical wavelength to be locally dropped from the first WDM optical signal, the first all-optical pass-through port residing on a modular card of the system;
      a first multiplexer to provide a second WDM optical signal for transmission external to the system; and
      a second all-optical pass-through port being optically connected to provide optical pass-through signals received at the second all-optical pass-through port to the first multiplexer for multiplexing, the second all-optical pass-through port residing on a modular card of the system;
   a second optical line terminal comprising:
      a line interface to receive from external to the system a third WDM optical signal having multiplexed therein at least one optical wavelength to be locally dropped by the system and at least one pass-through optical wavelength that is not to be locally dropped by the system;
      a second demultiplexer to demultiplex from the received third WDM optical signal the at least one optical wavelength to be locally dropped by the system;
      a third all-optical pass-through port to which the at least one pass-through wavelength of the received third WDM optical signal is provided optically to the exclusion of the at least one optical wavelength to be locally dropped from the third WDM optical signal, the third all-optical pass-through port residing on a modular card of the system that is physically distinct from the modular card on which resides the second all-optical pass through port of the first optical line terminal;
      a second multiplexer to provide a fourth WDM optical signal for transmission external to the system; and
      a fourth all-optical pass-through port being optically connected to provide optical pass-through signals received at the fourth all-optical pass-through port to the second multiplexer for multiplexing, the fourth all-optical pass-through port residing on a modular card of the system that is physically distinct from the modular card on which resides the first all-optical pass through port of the first optical line terminal;
   optical fiber optically connecting the first all-optical pass-through port to the fourth all-optical pass-through port, whereby the system permits the at least one pass-through optical wavelength from the received first WDM optical signal to be further transmitted by the system without any intervening electro-optical conversion by the system of the at least one pass-through optical wavelength; and
   optical fiber optically connecting the third all-optical pass-through port to the second all-optical pass-through port, whereby the system permits the at least one pass-through optical wavelength from the received third WDM optical signal to be further transmitted by the system without any intervening electro-optical conversion by the system of the at least one pass-through optical wavelength.

2. The WDM optical communication system of claim 1, wherein at least one of the first and second optical line terminals interface with an external fiber facility in a bidirectional manner to transmit and receive the corresponding WDM optical signals.

3. The WDM optical system of claim 2, wherein the first and second all-optical pass-through ports reside on the same modular card of the system.

4. The WDM optical system of claim 3, wherein the first and second all-optical pass-through ports are in common with one another such that that the at least one pass-through wavelength of the received first WDM optical signal and the at least one pass-through wavelength of the received third WDM optical signal are provided to a common all-optical pass-through port in a bidirectional manner.

5. The WDM optical system of claim 2, wherein the first and second all-optical pass-through ports reside on the same modular card of the system, and wherein the third and fourth all-optical pass-through ports reside on the same modular card of the system.

6. The WDM optical system of claim 5, wherein the first and second all-optical pass-through ports are in common with one another such that that the at least one pass-through wavelength of the received first WDM optical signal and the at least one pass-through wavelength of the received third WDM optical signal are provided to a first common all-optical pass-through port in a bidirectional manner, and wherein the third and fourth all-optical pass-through ports are in common with one another such that that the at least one pass-through wavelength of the received first WDM optical signal and the at least one pass-through wavelength of the received third WDM optical signal are provided to a second common all-optical pass-through port in a bidirectional manner.

7. The WDM optical system of claim 1, wherein the first optical line terminal demultiplexes the first WDM optical signal into at least one individual constituent optical wavelength of the first WDM optical signal and provides the at least one individual constituent optical wavelength to the first all-optical pass-through port as the at least one pass-through optical wavelength that is not to be locally dropped by the system.

8. The WDM optical system of claim 7, wherein each of the first and second optical line terminals further comprises a corresponding plurality of 1×N optical switches wherein each optical switch directs a demultiplexed individual constituent wavelength to an all-optical pass-through port when the switch is in a first mode, and alternatively directs the demultiplexed individual constituent wavelength away from an all-optical pass-through port when the switch is in a second mode.

9. The WDM optical system of claim 1, wherein the first optical line terminal demultiplexes the first WDM optical signal into at least one optical band and provides the at least one optical band to the first all-optical pass-through port as the at least one pass-through optical wavelength that is not to be locally dropped by the system.

10. The WDM optical system of claim 1, wherein the first and second all-optical pass-through ports reside on the same modular card of the system.

11. The WDM optical system of claim 10, wherein the first and second all-optical pass-through ports are in common with one another such that that the at least one pass-through wavelength of the received first WDM optical signal and the at least one pass-through wavelength of the received third WDM optical signal are provided to a common all-optical pass-through port in a bidirectional manner.

12. The WDM optical system of claim 1, wherein the first and second all-optical pass-through ports reside on the same modular card of the system, and wherein the third and fourth all-optical pass-through ports reside on the same modular card of the system.

13. The WDM optical system of claim 12, wherein the first and second all-optical pass-through ports are in common with one another such that that the at least one pass-through wavelength of the received first WDM optical signal and the at least one pass-through wavelength of the received third WDM optical signal are provided to a first common all-optical pass-through port in a bidirectional manner, and wherein the third and fourth all-optical pass-through ports are in common with one another such that that the at least one pass-through wavelength of the received first WDM optical signal and the at least one pass-through wavelength of the received third WDM optical signal are provided to a second common all-optical pass-through port in a bidirectional manner.

14. A wavelength division multiplexed (WDM) optical communication system comprising:
a first optical line terminal comprising:
a line interface to receive from external to the system a first WDM optical signal having multiplexed therein at least one optical wavelength to be locally dropped by the system and at least one pass-through optical wavelength that is not to be locally dropped by the system;
a first demultiplexer to demultiplex from the received first WDM optical signal the at least one optical wavelength to be locally dropped by the system;
a first all-optical pass-through port to which the at least one pass-through wavelength of the received first WDM optical signal is provided optically to the exclusion of the at least one optical wavelength to be locally dropped from the first WDM optical signal;
a first multiplexer to provide a second WDM optical signal for transmission external to the system; and
a second all-optical pass-through port being optically connected to provide optical pass-through signals received at the second all-optical pass-through port to the first multiplexer for multiplexing;
a second optical line terminal that is physically distinct from the first optical line terminal, comprising:
a line interface to receive from external to the system a third WDM optical signal having multiplexed therein at least one optical wavelength to be locally dropped by the system and at least one pass-through optical wavelength that is not to be locally dropped by the system;
a second demultiplexer to demultiplex from the received third WDM optical signal the at least one optical wavelength to be locally dropped by the system;
a third all-optical pass-through port to which the at least one pass-through wavelength of the received third WDM optical signal is provided optically to the exclusion of the at least one optical wavelength to be locally dropped from the third WDM optical signal;
a second multiplexer to provide a fourth WDM optical signal for transmission external to the system; and a fourth all-optical pass-through port being optically connected to provide optical pass-through signals received at the fourth all-optical pass-through port to the second multiplexer for multiplexing;
optical fiber optically connecting the first all-optical pass-through port to the fourth all-optical pass-through port, whereby the system permits the at least one pass-through optical wavelength from the received first WDM optical signal to be further transmitted by the system without any intervening electro-optical conversion by the system of the at least one pass-through optical wavelength; and
optical fiber optically connecting the third all-optical pass-through port to the second all-optical pass-through port, whereby the system permits the at least one pass-through optical wavelength from the received third WDM optical signal to be further transmitted by the system without any intervening electro-optical conversion by the system of the at least one pass-through optical wavelength.

15. The WDM optical communication system of claim 14, wherein at least one of the first and second optical line terminals interface with an external fiber facility in a bidirectional manner to transmit and receive the corresponding WDM optical signals.

16. The WDM optical system of claim 14, wherein the first optical line terminal demultiplexes the first WDM optical signal into at least one individual constituent optical wavelength of the first WDM optical signal and provides the at least one individual constituent optical wavelength to the first all-optical pass-through port as the at least one pass-through optical wavelength that is not to be locally dropped by the system.

17. The WDM optical system of claim 16, wherein each of the first and second optical line terminals further comprises a corresponding plurality of 1×N optical switches wherein each optical switch directs a demultiplexed individual constituent wavelength to an all-optical pass-through port when the switch is in a first mode, and alternatively directs the demultiplexed individual constituent wavelength away from an all-optical pass-through port when the switch is in a second mode.

18. The WDM optical system of claim 14, wherein the first optical line terminal demultiplexes the first WDM optical signal into at least one optical band and provides the at least one optical band to the first all-optical pass-through port as the at least one pass-through optical wavelength that is not to be locally dropped by the system.

19. A wavelength division multiplexed (WDM) optical communication system comprising:
a first optical line terminal comprising:
a line interface to receive from external to the system a first WDM optical signal having multiplexed therein at least one optical wavelength to be locally dropped by the system and at least one pass-through optical wavelength that is not to be locally dropped by the system;
a first demultiplexer to demultiplex from the received first WDM optical signal the at least one optical wavelength to be locally dropped by the system;
a first all-optical pass-through port to which the at least one pass-through wavelength of the received first WDM optical signal is provided optically, the first all-optical pass-through port residing on a first modular card;
a first multiplexer to provide a second WDM optical signal for transmission external to the system; and a second all-optical pass-through port residing on the first modular card, the second all-optical pass-through port being optically connected to provide optical pass-through signals received at the second all-optical pass-through port to the first multiplexer for multiplexing;

a second optical line terminal comprising:
  a line interface to receive from external to the system a third WDM optical signal having multiplexed therein at least one optical wavelength to be locally dropped by the system and at least one pass-through optical wavelength that is not to be locally dropped by the system;
  a second demultiplexer to demultiplex from the received third WDM optical signal the at least one optical wavelength to be locally dropped by the system;
  a third all-optical pass-through port to which the at least one pass-through wavelength of the received third WDM optical signal is provided optically, the third all-optical pass-through port residing on a second modular card that is physically distinct from the first modular card;
  a second multiplexer to provide a fourth WDM optical signal for transmission external to the system; and
  a fourth all-optical pass-through port residing on the second modular card, the fourth all-optical pass-through port being optically connected to provide optical pass-through signals received at the fourth all-optical pass-through port to the second multiplexer for multiplexing;

optical fiber optically connecting the first all-optical pass-through port on the first modular card to the fourth all-optical pass-through port on the second modular card, whereby the system permits the at least one pass-through optical wavelength from the first WDM optical signal to be further transmitted by the system without any intervening electro-optical conversion of the at least one pass-through optical wavelength; and optical fiber optically connecting the third all-optical pass-through port on the second modular card to the second all-optical pass-through port on the first modular card, whereby the system permits the at least one pass-through optical wavelength from the third WDM optical signal to be further transmitted by the system without any intervening electro-optical conversion of the at least one pass-through optical wavelength.

20. The WDM optical communication system of claim 19, wherein at least one of the first and second optical line terminals interface with an external fiber facility in a bidirectional manner to transmit and receive the corresponding WDM optical signals.

21. The WDM optical system of claim 19, wherein the first optical line terminal demultiplexes the first WDM optical signal into at least one individual constituent optical wavelength of the first WDM optical signal and provides the at least one individual constituent optical wavelength to the first all-optical pass-through port as the at least one pass-through optical wavelength that is not to be locally dropped by the system.

22. The WDM optical system of claim 21, wherein each of the first and second optical line terminals further comprises a corresponding plurality of 1×N optical switches wherein each optical switch directs a demultiplexed individual constituent wavelength to an all-optical pass-through port when the switch is in a first mode, and alternatively directs the demultiplexed individual constituent wavelength away from an all-optical pass-through port when the switch is in a second mode.

23. The WDM optical system of claim 19, wherein the first optical line terminal demultiplexes the first WDM optical signal into at least one optical band and provides the at least one optical band to the first all-optical pass-through port as the at least one pass-through optical wavelength that is not to be locally dropped by the system.

\* \* \* \* \*

UNITED STATES PATENT AND TRADEMARK OFFICE
CERTIFICATE OF CORRECTION

PATENT NO. : 6,721,508 B1
DATED : April 13, 2004
INVENTOR(S) : Ornan A. Gerstel et al.

It is certified that error appears in the above-identified patent and that said Letters Patent is hereby corrected as shown below:

Title page,
Item [73], Assignee, "Tellabs Operations Inc." should read
-- Tellabs Operations, Inc., Lisle (IL) --.
Item [57], ABSTRACT,
Line 3, "in service" should read -- in-service --.

Column 1,
Line 17, "all" should read -- all- --.

Column 3,
Line 14, "multiplexer/demultiplex 6" should read
-- multiplexer/demultiplexer 6 --;
Line 30, "than" should read -- then --;
Line 53, "S105'" should read -- step S105 --; and
Line 56, "step 106" should read -- step S106 --.

Column 4,
Line 2, "wave" should read -- wave- --.

Column 5,
Lines 35 and 37, "all optical" should read -- all-optical --.

Column 6,
Lines 5 and 7, "all optical" should read -- all-optical --.

Column 7,
Line 59, "pass through" should read -- pass-through --.

Column 8,
Lines 18, 30 and 36, "that that" should read -- that --.

UNITED STATES PATENT AND TRADEMARK OFFICE
CERTIFICATE OF CORRECTION

PATENT NO. : 6,721,508 B1
DATED : April 13, 2004
INVENTOR(S) : Ornan A. Gerstel et al.

It is certified that error appears in the above-identified patent and that said Letters Patent is hereby corrected as shown below:

Column 9,
Lines 3, 14 and 20, "that that" should read -- that --.

Signed and Sealed this

Twenty-sixth Day of July, 2005

JON W. DUDAS
*Director of the United States Patent and Trademark Office*